United States Patent Office 2,807,568
Patented Sept. 24, 1957

2,807,568

THERAPEUTIC COMPOSITIONS OF TETRA-CYCLINE GROUP ANTIBIOTIC AND PARA-HYDROXYBENZOIC ACID ESTER

Austin Joyner, Riveredge, N. J., and Joseph Francis Weidenheimer, Pearl River, N. Y., assignors to American Cyanamid Company, New York, N. Y., a corporation of Maine No Drawing. Application April 15, 1954,
Serial No. 423,516

6 Claims. (Cl. 167—65)

This invention relates to a therapeutically effective composition consisting essentially of a mixture of an antibiotic, such as chlortetracycline, oxytetracycline, tetracycline, bromotetracycline, their salts or complexes or mixtures thereof, and a therapeutically effective amount, at least about 1% by weight, of an alkyl or benzyl ester of para-hydroxybenzoic acid or a mixture of such esters.

This application is a continuation-in-part of application Serial Number 204,080 filed January 2, 1951, entitled "Therapeutic Compositions" and now abandoned.

The composition may be used with a carrier, such as a sugar, in a troche for oral use in the mouth, in tablets, in a dusting powder, and in lozenges, as well as in ointments, etc.

The esters of para-hydroxybenzoic acid have been frequently used as preservatives for various types of products. Patent 1,627,342 to Sabalitschka discloses the methyl ester to the extent of 0.7% as a preservative for marmalade. A rather comprehensive summary of the use of the esters of para-hydroxybenzoic acid as preservatives is found in the Drug and Cosmetic Industry 54; 408 (April 1944). The usual range as a preservative is from 0.05% to 0.2%.

We have found that, amazingly, therapeutically effective quantities of the esters, at least 1% by weight, exhibit remarkable characteristics in preventing various undesirable side reactions which have previously occurred with the administration of the tetracycline group antibiotics. We prefer to use from approximately 1 part of the para-hydroxybenzoic acid ester to 8 parts of the antibiotic up to approximately equal portions of each, but not less than 1% by weight of the para-hydroxybenzoate esters in the finished product as prepared for administration. With low concentrations of antibiotic more of the esters than of the antibiotic may be preferred.

The tetracycline group antibiotics include chlorotetracycline, oxytetracycline, tetracycline and bromotetracycline, and their therapeutically effective salts and complexes, and mixtures of such antibiotics. The hydrochloride salt is the most commonly used form of such antibiotics, but other acid salts such as the hydrobromide, the sulfate, etc. or alkali salts such as the sodium or calcium salts may be used, as well as the neutral form of the tetracycline group antibiotic.

It has been found that the tetracycline group antibiotics for example chlortetracycline in troches, that is, chlortetracycline mixed with a carrier such as dextrose or other sugar, if used orally to inhibit bacterial growth in the oral cavity will sometimes cause the mouth to become inflamed, forming small white pustules, causing the membranes of the mouth to become thick, crack and extremely painful. At times the mouth appears to be showing symptoms of thrush. We have now found that if approximately equal weight portions of an ester, or mixtures of esters, of para-hydroxybenzoic acid are mixed with the chlortetracycline, such undesirable side reactions do not occur. The proportions may vary widely depending upon the carriers used, and give excellent results.

Similar advantages are obtained in ointments and dental cones designed for use in the mouth as well as preparations designed for use in other body cavities. The mixture of a tetracycline group antibiotic and an ester of para-hydroxybenzoic acid in an ointment for use with infections of the skin prevents itching inflammations as a side reaction with far greater efficacy than either component alone. The effect seems to be therapeutically synergistic in nature. The mixture has been particularly effective in a vaginal dusting powder, in suppositories, skin ointments, etc. The mixture alleviates or prevents diarrhea, with foamy stools, rectal itching, vaginal itching and bleeding, and certain itching irritations of the skin, all of which symptoms are sometimes seen where the tetracycline group antibiotics are used without these esters. The exact proportions may vary depending upon the antibiotic which is being used, and its concentration in the carrier media.

The mixture is also effective internally where these antibiotics are taken by mouth. Chlortetracycline and oxytetracycline have from time to time caused undesirable side reactions in the gastro-intestinal tract. We find that if a lower alkyl ester or the benzyl ester of para-hydroxybenzoic acid, or a mixture of these, is administered with the antibiotic, it changes the effect of the antibiotic on the intestinal flora so that improved therapeutic effects are obtained. We prefer the esters with from 1 to 7 carbons in the alcohol moiety.

The use of the alkyl esters of para-hydroxybenzoic acid, particularly the methyl and propyl esters, gives excellent results. Many variations in such compositions are very useful; by way of example, but not limitation, certain of these are shown below:

EXAMPLE 1

*Chlortetracycline troches*

Chlortetracycline troches were prepared by mixing a standard blank granulation material consisting principally of sucrose. 1,473 grams of a blank granulation had admixed therein 15 grams of chlortetracycline hydrochloride, 4 grams of oil of peppermint, 13 grams of methyl para-hydroxybenzoate and 4 grams of propyl para-hydroxybenzoate. The materials were thoroughly mixed, and then compressed into 1000 troches on a standard pharmaceutical tableting machine; each containing approximately 15 milligrams of chlortetracycline hydrochloride and 17 milligrams of the esters (1.13% by weight of the para-hydroxybenzoate esters). The troches were administered to individuals with various types of mouth infections, and were found to be very efficacious. No cases of thrush or sore mouth developed during the use of the troches.

EXAMPLE 2

*Vaginal dusting powder*

A mixture consisting of 210 grams chlortetracycline hydrochloride, 8.0 grams methyl para-hydroxybenzoate, 2.0 grams propyl para-hydroxybenzoate and 778.5 grams of talc was screened, mixed and barrel-rolled for 10 minutes. 1.5 grams of lavender perfume were added and the powders again barrel-rolled to insure uniform distribution of the perfume. The powder contained 1% by weight of the para-hydroxybenzoate ester. The finished powder was then filled into suitable containers. The powder was used with individual handshakers and with insufflators and found to give remarkable efficient therapeutic action.

EXAMPLE 3

Oral capsules 1,444 grams of chlortetracycline hydrochloride, 781 grams of methyl para-hydroxybenzoate and 195 grams of propyl para-hydroxybenzoate were screened and thoroughly mixed. The blended powders were then filled into #1 shells. Each capsule contained approximately ¼ of a gram of chlortetracycline hydrochloride. The capsules were found to be very effective, particularly for gastrointestinal disorders. The capsules contained 40.4% by weight of the para-hydroxybenzoate esters.

EXAMPLE 4

Oral capsules 10 grams of chlortetracycline hydrochloride and 5 grams of methyl para-hydroxybenzoate were ground together until evenly dispersed. The composition was divided into 40 hard shell gelatin capsules for administration. The capsules contained 33% by weight of the para-hydroxybenzoate esters.

EXAMPLE 5

Grease base suppositories

A mixture was prepared of 206 grams of white wax, 341 grams of paraffin, 341 grams of anhydrous lanolin, 1,383 grams of cetyl alcohol and 4,388 grams of mineral oil USP. The mixture was heated to 55° C. and stirred until evenly blended. Thereto was added a powdered mixture containing a blend of 660 grams of chlortetracycline hydrochloride, 62 grams of methyl para-hydroxybenzoate and 21 grams of propyl para-hydroxybenzoate. The charge was homogenized, poured into torpedo shaped molds, and chilled, each mold containing approximately 0.25 gram of the chlortetracycline hydrochloride. The suppositories contained 1.12% by weight of the para-hydroxybenzoate esters.

EXAMPLE 6

Chlortetracycline vaginal ointment 17.25 grams of glyceryl monstearate, 34.50 grams USP lanolin, 51.75 grams of cerosin wax, 69 grams of white petrolatum and 270 grams of mineral oil were mixed and melted on a steam bath. 4.5 grams of chlortetracycline hydrochloride and 4.5 grams of pulverized benzyl para-hydroxybenzoate were then added to the melt, the mixture homogenized, partially cooled, and poured into standard ointment tubes. The finished product contained 1% each of chlortetracycline hydrochloride and benzyl para-hydroxybenzoate.

EXAMPLE 7

Vaginal Oblets

A granulation was prepared consisting of chlortetracycline hydrochloride and sucrose, mineral oil, methyl para-hydroxybenzoate and propyl para-hydroxybenzoate which were blended together with a small portion of acacia and yellow dye FDC No. 5 in such proportions that when compressed in an Oblet punch, Oblets were obtained containing:

| | Grams |
|---|---|
| Chlortetracycline hydrochloride | .2625 |
| Blank granulation | 1.9275 |
| Methyl p-hydroxybenzoate | 0.0177 |
| Propyl p-hydroxybenzoate | 0.0048 |
| Mineral oil | 0.01085 |

If the granulation does not compress readily a mold lubricant may be used to insure easier operation. A wetting agent may be added to the formulation. The Oblets contained 1.01% by weight of the para-hydroxybenzoate ester.

EXAMPLE 8

Oxytetracycline troches

Oxytetracycline troches were prepared after the method of Example 1, using oxytetracycline hydrochloride instead of chlortetracycline hydrochloride. The troches as thus prepared where found to have a much wider therapeutic spectrum than was obtained from oxytetracycline alone and were remarkably free from deleterious side reactions.

EXAMPLE 9

Chloreteracycline topical ointment

A mixture was prepared of 83.7 grams of white petrolatum and 10.0 grams of wool fat. The mixture was heated to 55° C. and stirred until evenly blended. Thereto was added a powdered mixture containing a blend of 3.3 grams of chlortetracycline hydrochloride, 2.4 grams of methyl para-hydroxybenzoate and 0.6 gram of propyl para-hydroxybenzoate. The charge was homogenized and poured into containers. The finished preparation contained 3.3% of chlortetracycline hydrochloride and 3% of mixed para-hydroxybenzoate esters by weight.

EXAMPLE 10

Tetracycline topical ointment

A mixture was prepared as in the preceding example, using 3.3 grams of tetracycline hydrochloride as the antibiotic. The finished ointment was essentially the same in appearance and possessed similar characteristics.

EXAMPLE 11

Calcium chlortetracycline cream

An ointment base was prepared mixing together 15 grams of glyceryl monostearate, 3 grams of polyethylene glycol monostearate, 5 grams of glycerin, 0.5 gram of sodium sulfite and 0.7 gram of calcium acetate. This mixture was homogenized at 60° C. and cooled to room temperature. To this mixture was added 2.4 grams of methyl para-hydroxybenzoate, 0.6 gram of propyl para-hydroxybenzoate, 2 grams of iodochlorohydroxyquinoline and 1.1 gram of calcium chlortetracycline. The mixture was again stirred and thereto was added enough water to dilute to a finished weight of 100 grams. The mixture was run through a colloid mill thereby producing a stable topical ointment. This ointment makes an excellent topical preparation for the treatment or prevention of skin infections.

As will be seen, the various tetracycline group antibiotics may be used in various forms. Greases, sugars, talc or other powders, etc. may be used as carriers or for dilution. Other therapeutically effective forms may be used. For example, chlortetracycline hydrochloride currently meets the medical preference, and accordingly is used in preparing the compositions set forth by example. Other acid salts of chlortetracycline or the free neutral chlortetracycline or the salt of chlortetracycline with a base may be used.

Having set forth certain embodiments thereof, as our invention we claim:

1. A composition comprising a mixture of a tetracycline group antibiotic from the group consisting of chlortetracycline, oxytetracycline, tetracycline and bromotetracycline and their salts and complexes, and at least one compound selected from the group consisting of the benzyl and the lower alkyl esters of para-hydroxybenzoic acid containing from 1 to 7 carbon atoms in the alcohol moiety, said esters of para-hydroxybenzoic acid being present in a therapeutically effective quantity greater than about 1% by weight of the total composition.

2. A therapeutic composition consisting essentially of a mixture of a tetracycline group antibiotic and a therapeutically effective quantity greater than about 1% by weight of the total composition, of an ester of para-hydroxybenzoic acid containing from 1 to 7 carbon atoms in the alcohol moiety.

3. A therapeutic composition consisting essentially of a mixture of a tetracycline group antibiotic from the group consisting of chlortetracycline, oxytetracycline, tetracycline and bromotetracycline and their salts and complexes, a therapeutically effective quantity greater than about 1% by weight, calculated on the weight of the total composition, of a lower alkyl ester of para-hydroxybenzoic acid containing from 1 to 7 carbon atoms in the alcohol moiety, and an inert carrier therefor.

4. A composition comprising a mixture of a tetracycline group antibiotic from the group consisting of chlortetracycline, oxytetracycline, tetracycline and bromotetracycline and their salts and complexes, and at least one compound selected from the group consisting of the benzyl and the lower alkyl esters of para-hydroxybenzoic acid, containing from 1 to 7 carbon atoms in the alcohol moiety, in which the weight ratio of the antibiotic is between about 8 parts and one part per part of the ester of para-hydroxybenzoic acid, said esters of para-hydroxybenzoic acid being present in a therapeutically effective quantity greater than about 1% by weight of the total composition.

5. A therapeutic composition consisting essentially of a mixture of chlortetracycline hydrochloride and a therapeutically effective quantity, not less than 12½% by weight of the quantity of chlortetracycline hydrochloride, nor less than about 1% by weight, calculated on the weight of the total composition, of one of the compounds selected from the group consisting of the benzyl and lower alkyl esters of para-hydroxybenzoic acid containing from 1 to 7 carbon atoms in the alcohol moiety.

6. Therapeutic capsules for oral administration comprising approximately ¼ of a gram of chlortetracycline hydrochloride and from ⅛ to ⅙ of a gram of the esters of para-hydroxybenzoic acid selected from the group consisting of the benzyl and lower alkyl esters of para-hydroxybenzoic acid containing from 1 to 7 carbon atoms in the alcohol moiety.

References Cited in the file of this patent

Metzger et al.: "Antibacterial Action of Oral Aureomycin on the Contents of the Colon of Man," Antibiotics and Chemotherapy, February 1952, pp. 91–102.

Harris: "Aureomycin and Chloramphenicol in Brucellosis," J. Am. Med. Assn., vol. 142, 1950, pp. 161–165.

U. S. Dispensatory, 24th Ed., 1947, J. B. Lippincott Co., pp. 709 and 710.